United States Patent
Nakashima et al.

(10) Patent No.: US 10,858,498 B2
(45) Date of Patent: Dec. 8, 2020

(54) GROUP OF PELLETS OF ETHYLENE-VINYL ALCOHOL COPOLYMER RESIN COMPOSITION

(71) Applicant: THE NIPPON SYNTHETIC CHEMICAL INDUSTRY CO., LTD., Osaka (JP)

(72) Inventors: Ayano Nakashima, Osaka (JP); Takamichi Tanabe, Osaka (JP); Nobuaki Sato, Osaka (JP); Eisaku Yokoya, Osaka (JP); Seiichi Honda, Osaka (JP); Kaoru Inoue, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/061,389

(22) PCT Filed: Dec. 21, 2016

(86) PCT No.: PCT/JP2016/088043
§ 371 (c)(1),
(2) Date: Jun. 12, 2018

(87) PCT Pub. No.: WO2017/110844
PCT Pub. Date: Jun. 29, 2017

(65) Prior Publication Data
US 2018/0355146 A1    Dec. 13, 2018

(30) Foreign Application Priority Data

Dec. 21, 2015 (JP) ................................ 2015-248491

(51) Int. Cl.
| | |
|---|---|
| *C08K 5/09* | (2006.01) |
| *C08L 29/04* | (2006.01) |
| *C08K 5/098* | (2006.01) |
| *B29B 9/12* | (2006.01) |
| *B29B 9/06* | (2006.01) |

(52) U.S. Cl.
CPC ............ *C08K 5/09* (2013.01); *B29B 9/12* (2013.01); *C08K 5/098* (2013.01); *C08L 29/04* (2013.01); *B29B 9/06* (2013.01); *B29B 9/065* (2013.01)

(58) Field of Classification Search
None
See application file for complete search history.

(56) References Cited

U.S. PATENT DOCUMENTS

| | | |
|---|---|---|
| 6,232,382 B1 | 5/2001 | Ninomiya et al. |
| 6,451,967 B1 | 9/2002 | Ninomiya et al. |
| 2001/0025087 A1 | 9/2001 | Kazeto et al. |
| 2002/0100997 A1 | 8/2002 | Kawahara et al. |
| 2003/0060550 A1 | 3/2003 | Inomata et al. |
| 2004/0082690 A1 | 4/2004 | Kawahara et al. |
| 2009/0312462 A1* | 12/2009 | Oakley ............... C08L 3/02 524/47 |

FOREIGN PATENT DOCUMENTS

| | | |
|---|---|---|
| CN | 1287051 A | 3/2001 |
| CN | 1198709 C | 4/2005 |
| JP | 11-106592 | 4/1999 |
| JP | 2000-43040 | 2/2000 |
| JP | 2000-136281 A | 5/2000 |
| JP | 2001-96529 | 4/2001 |
| JP | 2001-164059 | 6/2001 |

OTHER PUBLICATIONS

International Search Report issued in International Patent Application No. PCT/JP2016/088043, dated Feb. 28, 2017.
International Preliminary Report on Patentability issued in International Patent Application No. PCT/JP2016/088043, dated Jun. 26, 2018.
Supplemental European Search Report issued for European Patent Application No. 16878731.5 dated Jun. 26, 2019.
Taiwanese Office Action issued in TW Patent Application No. 105142352, dated Feb. 6, 2020, English translation.
Japanese Office Action issued in Japanese Patent Application No. JP2016-574469, dated Feb. 18, 2020, English translation.
Chinese Office Action issued in CN Patent Application No. 201680071737.X, dated Feb. 18, 2020, English translation.
Study on Processing and Property of Three-Layer Co-extrusion Barrier Films, China Plastics, by Side Li, Jianxun Luo, Li Gao, Lixin Mao, vol. 25, No. 10, Oct. 2011, English translation.
Taiwanese Office Action issued in TW Patent Application No. 105142352, dated Aug. 4, 2020, English translation.

* cited by examiner

*Primary Examiner* — Robert T Butcher
(74) *Attorney, Agent, or Firm* — Greenblum & Bernstein, P.L.C.

(57) ABSTRACT

An ethylene-vinyl alcohol copolymer resin composition pellet group is provided, which is excellent in long-run processability. The ethylene-vinyl alcohol copolymer resin composition pellet group is a group of pellets of an ethylene-vinyl alcohol copolymer resin composition containing an ethylene-vinyl alcohol copolymer and a divalent metal salt, wherein not greater than 3% of the pellets have a b*-value of not less than 5 after the pellets are heat-treated at 230° C. for 30 minutes.

1 Claim, No Drawings

GROUP OF PELLETS OF ETHYLENE-VINYL ALCOHOL COPOLYMER RESIN COMPOSITION

TECHNICAL FIELD

The present disclosure relates to a group of pellets of an ethylene-vinyl alcohol copolymer resin composition and, more specifically, to a group of pellets of an ethylene-vinyl alcohol copolymer resin composition excellent in long-run processability during a melt forming process.

BACKGROUND ART

Conventional ethylene-vinyl alcohol copolymers (hereinafter sometimes referred to as "EVOH resin") generally have very strong intermolecular forces due to hydrogen bonds between hydroxyl groups present in polymer side chains. Such an EVOH resin has high crystallinity and, hence, strong intermolecular forces even in its amorphous portion. Therefore, gas molecules and the like are less liable to pass through the EVOH resin, so that a film of the EVOH resin is excellent in gas barrier property.

Taking advantage of the excellent gas barrier property, the EVOH resin is formed into films, sheets, bottles and other containers for use as food packaging materials, pharmaceutical product packaging materials, industrial chemical packaging materials, agricultural chemical packaging materials, and the like.

For production of the films, the sheets, and the like of the EVOH resin, the EVOH resin is heat-melted and formed into an intended shape by an extruder or the like. During a long-time melt-forming process, however, the EVOH resin is liable to experience thermal history to be thereby deteriorated. Therefore, colored matter and crosslinked matter of the EVOH resin are liable to occur in the forming machine. If a product formed of the EVOH resin is contaminated with the colored matter and the crosslinked matter, the formed product suffers from coloration and poorer appearance such as fish eyes and gelation. Therefore, the EVOH resin requires improvement in long-run processability.

For improvement of the formability and the long-run processability of the EVOH resin, an EVOH resin composition is proposed that contains the EVOH resin, acetic acid, and at least one of magnesium acetate and calcium acetate in specific proportions (PTL 1). When the EVOH resin stagnates in the forming machine to start experiencing the thermal history, the melt viscosity of the EVOH resin is reduced, so that the EVOH resin is expelled by its own pressure. Thus, the colored matter and the crosslinked matter can be suppressed, which may otherwise occur when the EVOH resin experiences the thermal history for a long period of time, whereby the long-run processability is improved.

RELATED ART DOCUMENT

Patent Document

PTL 1: JP-A-HEI11(1999)-106592

SUMMARY OF INVENTION

However, detailed studies conducted by the inventors revealed that the EVOH resin composition containing the metal salt and the acid in the specific proportions as disclosed in PTL 1 fails to sufficiently reduce the viscosity thereof during the heating, still requiring improvement in the long-run formability. Thus, there is a demand for EVOH resin composition pellets improved in long-run formability by sufficient reduction of the viscosity.

In view of the foregoing, the inventors conducted intensive studies and, as a result, found that the aforementioned object can be achieved by a group of EVOH resin composition pellets containing a divalent metal salt with not greater than 3% of the EVOH resin composition pellets colored by a predetermined heat treatment performed on the EVOH resin composition pellets.

According to an inventive aspect, there is provided a group of pellets of an EVOH resin composition containing an ethylene-vinyl alcohol copolymer and a divalent metal salt, wherein not greater than 3% of the pellets have a b*-value of not less than 5 after the pellets are heat-treated at 230° C. for 30 minutes.

According to the inventive aspect, not greater than 3% of the pellets of the EVOH resin composition containing the ethylene-vinyl alcohol copolymer and the divalent metal salt have a b*-value of not less than 5 after the pellets are heat-treated at 230° C. for 30 minutes. Therefore, the group of the EVOH resin composition pellets has a reduced melt viscosity during the heating thereof, and is excellent in long-run processability.

Where the divalent metal salt is present in a proportion of 0.0005 to 0.002 parts by weight on a metal basis based on 100 parts by weight of the EVOH resin in the EVOH resin composition, the EVOH resin composition pellet group is better in long-run processability.

DESCRIPTION OF EMBODIMENTS

The present disclosure will hereinafter be described in detail by way of an embodiment thereof. However, it should be understood that the embodiment is illustrative of the disclosure but not limitative of the disclosure.

The inventive EVOH resin composition pellet group is a group of pellets produced from a resin composition containing an ethylene-vinyl alcohol copolymer and a divalent metal salt. The respective components will hereinafter be described in detail.

[EVOH Resin]

The EVOH resin to be used in the present disclosure is generally a water-insoluble thermoplastic resin prepared by copolymerizing ethylene and a vinyl ester monomer and saponifying the resulting copolymer. Vinyl acetate is typically used as the vinyl ester monomer for economy. Known polymerization methods such as a solution polymerization method, a suspension polymerization method and an emulsion polymerization method may be used for the polymerization. A solution polymerization method using methanol as a solvent is generally used. The resulting ethylene-vinyl ester copolymer may be saponified by a known method.

That is, the EVOH resin mainly contains an ethylene structural unit and a vinyl alcohol structural unit, and further contains a very small amount of a vinyl ester structural unit that remains unsaponified.

The EVOH resin typically has an ethylene content of 20 to 60 mol %, preferably 25 to 55 mol %, particularly preferably 40 to 50 mol %. If the ethylene content is excessively low, the EVOH resin tends to be poorer in high-humidity gas barrier property and melt formability. If the ethylene content is excessively high, on the other hand, the EVOH resin tends to be poorer in gas barrier property. The ethylene content of the EVOH resin is measured in conformity with ISO14663-1(1999).

The EVOH resin typically has a saponification degree of not less than 90 mol %, preferably not less than 94 mol %, particularly preferably not less than 96 mol %, most preferably not less than 99 mol %. If the saponification degree is excessively low, the EVOH resin tends to be poorer in gas barrier property, heat stability and moisture resistance. The saponification degree of the EVOH resin is measured, for example, in conformity with JIS K6726(1994) (by using a solution prepared by homogenously dissolving the EVOH resin in a water/methanol solvent).

The EVOH resin typically has a melt index (MI) of 0.1 to 100 g/10 minutes, preferably 1 to 50 g/10 minutes, particularly preferably 1.5 to 30 g/10 minutes, further preferably 2 to 30 g/10 minutes, most preferably 8 to 15 g/10 minutes (as measured at 210° C. with a load of 2160 g). If the melt index is smaller than the aforementioned range, a higher torque will occur in the extruder during the forming, making the extrusion of the EVOH resin difficult. If the melt index is greater than the aforementioned range, a product formed from the EVOH resin tends to have insufficient mechanical strength.

The EVOH resin to be used in the present disclosure may further contain a structural unit derived from any of the following comonomers in a proportion that does not impair the effects of the present disclosure (e.g., in a proportion of not greater than 10 mol %). The comonomers include: α-olefins such as propylene, isobutene, α-octene, α-dodecene and α-octadecene; hydroxyl-containing α-olefins such as 3-buten-1-ol, 4-penten-1-ol and 3-butene-1,2-diol, esterification products of the hydroxyl-containing α-olefins such as 3,4-diacetoxy-1-butene, 2,3-diacetoxy-1-allyloxypropane, 2-acetoxy-1-allyloxy-3-hydroxypropane, 3-acetoxy-1-allyloxy-2-hydroxypropane, 1,3-diacetoxy-2-methylenepropane, 1,3-dipropionyloxy-2-methylenepropane, 1,3-dibutyroyloxy-2-methylenepropane and hydroxymethyl vinylidene diacetates, and other hydroxyl-containing α-olefin derivatives such as acylation products of the hydroxyl-containing α-olefins; unsaturated carboxylic acids, and salts, partial alkyl esters, full alkyl esters, nitriles, amides, and anhydrides of the unsaturated carboxylic acids; unsaturated sulfonic acids, and salts of the unsaturated sulfonic acids; and vinylsilane compounds, vinyl chloride, and styrene.

A post-modified EVOH resin such as an urethanized, acetalized, cyanoethylated, or oxyalkylenated EVOH resin is also usable as the EVOH resin.

Particularly, an EVOH resin prepared by the copolymerization with a hydroxyl-containing α-olefin contains a primary hydroxyl group introduced in its side chain by the copolymerization and, therefore, has excellent secondary formability in a stretching process and a vacuum/pressure forming process. Particularly, an EVOH resin having a 1,2-diol structure in its side chain is preferred.

[Divalent Metal Salt]

The EVOH resin composition for the inventive EVOH resin composition pellet group contains the EVOH resin and the divalent metal salt as described above.

The divalent metal salt is generally a salt of a metal element from typical elements. The divalent metal salt is preferably water-soluble for production working efficiency.

Preferred examples of the divalent metal salt include salts of Periodic Table Group 2 elements and Group 12 elements. Particularly, magnesium salts, calcium salts, and zinc salts are preferred. These salts may be inorganic salts such as carbonates, hydrogen carbonates, phosphates, borates, sulfates, and chlorides, and organic acid salts such as monocarboxylic acid salts having 2 to 11 carbon atoms (acetates, butyrates, propionates, enanthates, and caprates), dicarboxylic acid salts having 2 to 11 carbon atoms (oxalates, malonates, succinates, adipates, suberates, and sebacates), monocarboxylic acid salts having 12 or more carbon atoms (laurates, palmitates, stearates, 12-hydroxystearates, behenates, and montanates), and citrates. The organic acid salts are preferred, and the C2 to C4 monocarboxylic acid salts are further preferred. The acetates and the propionates are particularly preferred, and the acetates are most preferred.

That is, the divalent metal salt is preferably a divalent metal salt of an organic acid such as a magnesium salt, a calcium salt, or a zinc salt of a C2 to C11 monocarboxylic acid, more preferably a magnesium salt, a calcium salt, or a zinc salt of an aliphatic C2 to C11 monocarboxylic acid, further preferably a magnesium salt, a calcium salt, or a zinc salt of a C2 to C4 monocarboxylic acid, most preferably magnesium acetate, calcium acetate, or zinc acetate.

The proportion of the divalent metal salt in the EVOH resin composition is typically 0.0005 to 0.002 parts by weight, preferably 0.0005 to 0.0015 parts by weight, more preferably 0.0006 to 0.001 part by weight, on a metal basis based on 100 parts by weight of the EVOH resin. If the proportion of the divalent metal salt is excessively small, the EVOH resin composition tends to be poorer in long-run processability with the melt viscosity thereof insufficiently reduced during the heating. If the proportion of the divalent metal salt is excessively great, the EVOH resin composition is liable to be thermally decomposed to suffer from odor emission and coloration during the heating. The proportion of the divalent metal salt is determined by ashing the EVOH resin composition, analyzing the resulting ash by ICP emission spectrometry, and converting the resulting value based on the weight of the EVOH resin.

[EVOH Resin Composition Pellets]

The EVOH resin composition pellets to be used in the present disclosure are pellets of the EVOH resin composition containing the EVOH resin and the divalent metal salt. The inventive EVOH resin composition pellet group is produced from the EVOH resin composition pellets.

Exemplary methods for producing the EVOH resin composition pellets containing the divalent metal salt will hereinafter be described.

Conventionally known methods may be used for the production of the EVOH resin composition pellets. Examples of the methods include:

(I) a method in which the divalent metal salt is blended with a solution of the EVOH resin, and the resulting solution is subjected to coagulation, palletization, and drying processes in a known manner; and (II) a method in which a solution of the EVOH resin is prepared and put in a coagulation liquid for coagulation and pelletization of the EVOH resin, and the resulting pellets are kept in contact with an aqueous solution of the divalent metal salt and then dried.

For the preparation of the EVOH resin solution, the EVOH resin is simply dissolved in a dissolvable solvent. The solvent and the method to be employed for the dissolution are not particularly limited. Examples of the solvent include methanol, ethanol, propanol, phenol, dimethyl sulfoxide (DMSO), dimethylformamide (DMF), hexafluoroisopropanol (HFIP), and other solvents, and an aqueous solution (mixture solution) containing any of these solvents.

The water/solvent mixing weight ratio of the aqueous solution is typically 80/20 to 5/95, preferably 75/25 to 20/80, more preferably 70/30 to 30/70, particularly preferably 50/50 to 30/70. If the proportion of water in the aqueous solution is excessively small, the pellets are liable to be whitened. If the proportion of water is excessively great, on the other hand, the solution tends to have poorer stability, so that the EVOH resin is liable to clog piping due to deposition thereof.

Exemplary methods for preparing the EVOH resin solution include:

i) a method in which EVOH resin powder or EVOH resin pellets are dissolved to a predetermined concentration in a solvent or a water/solvent mixture solution;

ii) a method in which a proper amount of a solvent, water or a water/solvent mixture solution is added to a solution of the EVOH resin obtained after the saponification in the production of the EVOH resin; and iii) a method in which hydrous EVOH resin pellets obtained after the EVOH resin is deposited and/or washed with water in the production of the EVOH resin are dissolved in a solvent or a water/solvent mixture solution to a predetermined concentration and a predetermined liquid formulation. Among these methods, the method ii) is preferred for productivity.

In the method (I) in which the divalent metal salt is blended with the EVOH resin solution, a predetermined proportion of the divalent metal salt is simply added to the EVOH resin solution. In this blending method, the divalent metal salt may be directly added to the EVOH resin solution and then mixed with the EVOH resin solution by shearing, or a divalent metal salt solution may be prepared by dissolving the divalent metal salt in the water or the mixture solution and then added to the EVOH resin solution. Further, the divalent metal salt solution may be prepared by using a good solvent for the EVOH resin and then blended with the EVOH resin.

The EVOH resin solution thus prepared or the EVOH resin composition solution prepared in the method (I) may be used as it is, or may be properly concentrated or diluted, or conditioned by addition of water.

Additionally, a lubricant such as a saturated aliphatic amide (e.g., stearamide or the like), an unsaturated aliphatic amide (e.g., oleamide or the like), a bis-fatty acid amide (e.g., ethylenebisstearamide or the like), or a low-molecular weight polyolefin (e.g., a low-molecular weight polyethylene or a low-molecular weight polypropylene having a molecular weight of about 500 to about 10,000 or the like), a plasticizer such as of an aliphatic polyhydric alcohol (e.g., ethylene glycol, glycerin, hexanediol, or the like), an antioxidant, a UV absorber, a colorant, an antibacterial agent, an anti-blocking agent and/or a slip agent may be blended in the EVOH resin composition.

The EVOH resin (composition) solution is extruded in a coagulation liquid, followed by pelletization. The temperature of the EVOH resin (composition) solution during the extrusion is preferably lower than the boiling point of the water/solvent mixture solution. More specifically, the temperature of the EVOH resin (composition) solution is typically 45° C. to 70° C., preferably 50° C. to 69° C., more preferably 55° C. to 68° C. If the temperature of the EVOH resin (composition) solution during the extrusion is excessively low, the EVOH resin (composition) is liable to deposit to be solidified in the extruder. If the temperature of the EVOH resin (composition) solution is excessively high, on the other hand, the coagulation tends to be insufficient.

Examples of the coagulation liquid include water, water/alcohol mixture solutions, aromatic hydrocarbons such as benzene, ketones such as acetone and methyl ethyl ketone, ethers such as dipropyl ether, and organic acid esters such as methyl acetate, ethyl acetate, and methyl propionate, which may be used alone or in combination. A coagulation liquid having a higher water content can reduce the amount of fine pieces of the pellets. Particularly, water and the water/alcohol mixture solutions (typically having a water/alcohol weight ratio of 90/10 to 99/1) are preferred for easy handling. Exemplary alcohols to be contained in the water/alcohol mixture solutions include methanol, ethanol, and propanol, and ethanol is industrially preferred.

The temperature of the coagulation liquid when the EVOH resin (composition) solution is kept in contact with the coagulation liquid may be a temperature at which the EVOH resin (composition) is easily coagulated. More specifically, the temperature of the coagulation liquid is preferably a low temperature on the order of 3° C. or lower. The temperature of the coagulation liquid is typically −10° C. to 3° C., more preferably −5° C. to 3° C., particularly preferably 0° C. to 2° C. The intended EVOH resin composition pellets can be produced by thus setting the temperature of the coagulation liquid at the aforementioned specific temperature. This is particularly effective where the EVOH resin (composition) pellets have a lower ethylene content. Since the coagulation liquid is a nonsolvent for the saponification product, there is no fear that the saponification product is dissolved in the coagulation liquid to result in a resin loss. However, the operation is preferably performed at a lower temperature.

A retention time during which the EVOH resin (composition) is retained in the coagulation liquid varies depending on the concentration, the ethylene content, and the saponification degree of the resin and the water/solvent mixing weight ratio, but may be a period that ensures sufficient coagulation of the EVOH resin (composition). More specifically, the retention time is typically 10 to 400 seconds, preferably 30 to 200 seconds, more preferably 50 to 100 seconds. If the retention time is excessively short, the coagulation tends to be insufficient. If the retention time is excessively long, the productivity tends to be reduced.

Subsequently, the solidified EVOH resin (composition) is cut, and then washed with water. The cutting method is properly selected from a strand cutting method and an in-water cutting method (e.g., an under-water cutting method or the like).

In the strand cutting method, strands (continuous rods) produced by extruding the EVOH resin (composition) solution in the coagulation liquid and depositing the EVOH resin (composition) or strands produced by extruding the EVOH resin (composition) solution and cooling and coagulating the EVOH resin (composition) are cut into pellets having a predetermined size by means of a strand cutter, whereby cylindrical EVOH resin (composition) pellets are produced.

In the in-water cutting method (e.g., the under-water cutting method), spherical EVOH resin (composition) pellets are produced by extruding the EVOH resin (composition) solution in the coagulation liquid and cutting the resulting strands into pellets having a predetermined size by means of a cutter in a state such that the strands are not completely solidified to the inner side. The pellets produced by this method are spherical or oval (e.g., a rugby ball shape or the like) because the EVOH resin (composition) solution is smoothly rounded by surface tension.

For working efficiency during the forming process and easy handling, the cylindrical EVOH resin (composition) pellets produced by the cutting by the strand cutting method each have a bottom face diameter of 1 to 6 mm and a length of 1 to 6 mm (preferably a bottom face diameter of 2 to 5 mm and a length of 2 to 5 mm), and the oval EVOH resin (composition) pellets produced by the cutting by the in-water cutting method each have a diameter of 1 to 6 mm (preferably a diameter of 2 to 5 mm) for practicality.

The EVOH resin (composition) pellets are typically washed with water in a water bath. Particularly, the EVOH resin solution obtained by the method (ii) generally contains an alcohol having not more than 5 carbon atoms (used as the solvent in the saponification) and acetic acid and sodium acetate (produced as by-products in the saponification) and, therefore, it is preferred to wash the pellets with water. The washing with water makes it possible to adjust the amounts of the alcohol having not more than 5 carbon atoms, acetic acid and sodium acetate contained in the EVOH resin (composition) pellets and to remove oligomers and impurities.

In the washing with water, water is typically used in an amount of 200 to 1000 parts by weight, preferably 200 to 600 parts by weight, based on 100 parts by weight of the EVOH resin (composition) pellets, and the water temperature is typically 10° C. to 50° C., preferably 25° C. to 35° C. Further, the washing period is typically 0.5 to 5 hours, preferably 1 to 4 hours, and the number of times of the washing is typically 1 to 5.

The amounts of the alcohol having not more than 5 carbon atoms, acetic acid, and sodium acetate are preferably adjusted to 0.0001 to 1 part by weight, 0.01 to 1 part by weight and 0.01 to 1 part by weight, respectively, by washing the pellets with water or by keeping the pellets in contact with an aqueous solution of an additive.

Where the EVOH resin is pelletized and kept in contact with the aqueous solution of the divalent metal salt in the method (II), the divalent metal salt (e.g., magnesium acetate, calcium acetate, zinc acetate, or the like) is incorporated into the EVOH resin pellets by keeping the EVOH resin pellets in contact with the aqueous solution of the divalent metal salt. At this time, as required, an additive other than the divalent metal salt may be added to the aqueous solution.

Examples of the additive include heat stabilizers such as of organic acids (e.g., acetic acid, propionic acid, butyric acid, lauric acid, stearic acid, oleic acid, behenic acid, and the like), alkali metal salts (sodium salts, potassium salts, and the like) of these organic acids, inorganic acids (e.g., sulfuric acid, sulfurous acid, carbonic acid, phosphoric acid, boric acid, and the like), and alkali metal salts (sodium salts, potassium salts and the like) of these inorganic acids. The additive may be contained in the EVOH resin pellets in an amount that does not impair the effects of the present disclosure. The amount of the additive to be contained in the EVOH resin pellets is typically not greater than 3 parts by weight, preferably 0 to 1 part by weight, based on 100 parts by weight of the EVOH resin. Among the aforementioned additives, acetic acid, boric acid, boron compounds including borates, alkali metal salts of acetic acid, and alkali metal salts of phosphoric acid are preferred.

Where the EVOH resin composition pellets contain any of the aforementioned additives, the pellets are improved in various physical properties, e.g., heat stability during the melt forming process.

The total concentration of the additives to be contained in the aqueous solution containing the divalent metal salt is typically not higher than 3 parts by weight, preferably 0.0005 to 1.5 parts by weight, based on 100 parts by weight of the EVOH resin in the EVOH resin pellets. Preferably, the concentration of acetic acid is typically adjusted to 0.001 to 1 part by weight based on 100 parts by weight of the EVOH resin, and the concentration of the boron compound is typically adjusted to 0.001 to 1 part by weight on a boron basis (as measured by the ICP emission spectrometry after the ashing) based on 100 parts by weight of the EVOH resin. The concentration of the alkali metal salt of acetic acid and/or the alkali metal salt of phosphoric acid (including a hydrogen phosphate) is typically adjusted to 0.0005 to 0.1 part by weight on an alkali metal basis (as measured by the ICP emission spectrometry after the ashing) based on 100 parts by weight of the EVOH resin. Further, the concentration of the divalent metal salt is preferably adjusted to 0.0001 to 1 part by weight on a metal basis (as measured by the ICP emission spectrometry after the ashing) based on 100 parts by weight of the EVOH resin.

It is preferred to adjust the concentration of acetic acid to 0.001 to 1 part by weight, adjust the concentration of the boron compound to 0.001 to 1 part by weight on a boron basis (as measured by the ICP emission spectrometry after the ashing) and to adjust the concentration of the alkali metal salt of acetic acid and/or the alkali metal salt of phosphoric acid (including the hydrogen phosphate) to 0.0005 to 0.1 part by weight on an alkali metal basis (as measured by the ICP emission spectrometry after the ashing) based on 100 parts by weight of the EVOH resin by keeping the EVOH resin pellets in contact with the aqueous solution of the additives. The concentration of the divalent metal salt is adjusted in the aforementioned manner.

Thus, the EVOH resin composition pellets containing the EVOH resin and the divalent metal salt are produced in an undried state.

Then, the undried EVOH resin composition pellets are dried. Various drying methods may be employed for the drying. A fluidized drying process is preferably performed. More preferably, the fluidized drying process and a stationary drying process are used in combination for the drying. Particularly preferably, the stationary drying process is performed after the fluidized drying process.

In the fluidized drying process, the EVOH resin composition pellets are substantially dried while being agitated and spread mechanically or by hot air. Exemplary dryers for the fluidized drying process include a drum/groove type agitation dryer, a round pipe dryer, a rotary dryer, a fluid bed dryer, a vibrating fluid bed dryer, and a conical rotor type dryer. In the stationary drying process, the EVOH resin composition pellets are substantially dried without the agitation, the spreading and other dynamic action. Exemplary dryers for the stationary drying process include non-material-moving type dryers such as a batch box type dryer, and material-moving type dryers such as a band dryer, a tunnel dryer, and a vertical silo dryer. The dryers to be used for these drying processes are not limited to these dryers.

Thus, the EVOH resin composition pellets containing the EVOH resin and the divalent metal salt are produced. The inventive EVOH resin composition pellet group should be such that, after the EVOH resin composition pellets are heat-treated at 230° C. for 30 minutes in air, the percentage of pellets having colored pellet surfaces is not higher than 3% with respect to the overall EVOH resin composition pellets. More specifically, about 100 EVOH resin composition pellets are placed on an aluminum foil in a muffle furnace preheated to 230° C. and heat-treated for 30 minutes. Then, the pellets are taken out together with the aluminum foil from the muffle furnace and cooled in air. Thereafter, the surfaces of the resulting pellets are each analyzed through the spectrometry by means of a spectrophotometer. A pellet having a b*-value of not less than 5 in an SCI (specular component included) mode is defined as a colored pellet. The percentage of the colored pellets, i.e., the percentage of pellets each having a b*-value of not less than 5, with respect to all the heat-treated pellets should be not higher than 3%. In general, the EVOH resin composition pellets are colorless or pale yellow, but the colored pellets are deep yellow or brown and, therefore, each have a higher b*-value. If the percentage of the colored pellets is higher than 3%, the pellets are liable to be poorer in long-run processability with the melt viscosity thereof insufficiently reduced during the heating.

In general, EVOH resin composition pellets containing the divalent metal salt in a greater proportion tend to be significantly colored by the heat treatment thereof and, at the same time, tend to have improved long-run processability with the melt viscosity thereof significantly reduced during the heating. However, it was unexpectedly found that, in the group of the EVOH resin composition pellets produced under the same conditions, the individual pellets contain substantially the same amount of the divalent metal salt but, when the number of the pellets colored by the heat treatment is smaller, the EVOH resin composition pellets are improved in long-run processability with the melt viscosity thereof significantly reduced.

It is not clear why the pellets are colored after the heat treatment, but this is supposedly because the divalent metal salt is locally present in the pellets. It is considered that, when the undried EVOH resin composition pellets containing the EVOH resin and the divalent metal salt are rapidly dried in the drying step, for example, the divalent metal salt migrates to the pellet surfaces together with water contained in the pellets to be thereby locally present and, when the pellets are heat-treated after the drying, the pellet surfaces are colored due to the divalent metal salt locally present on the pellet surfaces. Therefore, the migration of the divalent metal salt should be prevented in the group of the EVOH resin composition pellets in order to reduce the percentage of the colored pellets after the heat treatment to not higher than 3%.

Exemplary methods for reducing the percentage of the colored pellets after the heat treatment include:
(1) a method in which the solvent formulation of the EVOH resin solution is moderately uniformized in the pelletizing step;
(2) a method in which the resin concentration of the EVOH resin solution is moderately uniformized in the pelletizing step;
(3) a method in which the concentration of the divalent metal salt is moderately uniformized in the EVOH resin composition pellets in the pelletizing step; and
(4) a method in which drying conditions are moderately uniformized in the step of drying the undried EVOH resin composition pellets.

In the method (1), the expression "the solvent formulation of the EVOH resin solution is moderately uniformized" means that the solvent formulation of the EVOH resin solution is uniformized so that the proportion of water in the water/solvent mixture solution is not locally reduced. In the method (2), the expression "the resin concentration of the EVOH resin solution is moderately uniformized" means that the resin concentration of the EVOH resin solution is uniformized so as not to be locally reduced.

In the methods (1) and (2), however, it is difficult to detect the uniformization state of the EVOH resin solution. Therefore, the concentration of the divalent metal salt is uniformized so as not to be localized in the EVOH resin composition pellets in the method (3) or the drying conditions are moderately uniformized in the step of drying the EVOH resin composition pellets in the method (4), whereby the migration of the divalent metal salt is suppressed to advantageously produce the inventive EVOH resin composition pellet group.

The method (3) in which the concentration of the divalent metal salt is uniformized in the EVOH resin composition pellets will be described in detail. In this method, the divalent metal salt may be uniformly blended with the EVOH resin pellets. In this method, as in the method (I), the divalent metal salt is added to and homogeneously mixed with the EVOH resin solution and the EVOH resin composition is solidified from the solution to be pelletized, whereby the EVOH resin composition pellets containing the divalent metal salt uniformly present therein are produced. Alternatively, when the EVOH resin pellets are kept in contact with the aqueous solution of the divalent metal salt, the proportion of the aqueous solution of the divalent metal salt with respect to the EVOH resin pellets is increased to prevent the localization of the divalent metal salt concentration, whereby the pellets containing the divalent metal salt uniformly present therein are produced.

Where the EVOH resin pellets are kept in contact with the aqueous solution of the divalent metal salt, the proportion of the aqueous solution of the divalent metal salt is 200 to 1000 parts by weight, preferably 200 to 600 parts by weight, based on 100 parts by weight of the EVOH resin pellets.

The temperature of the aqueous solution of the divalent metal salt during the contact is preferably 10° C. to 80° C., more preferably 20° C. to 60° C., particularly preferably 25° C. to 40° C. The contact period is preferably 0.5 to 6 hours, more preferably 1 to 5 hours. An exemplary contact method is to keep the EVOH resin pellets in contact with the aqueous solution of the divalent metal salt by changing the aqueous solution 1 to 5 times or by continuously changing the aqueous solution.

The method (4) in which the drying conditions are moderately uniformized will be described in detail.

The pellets are dried by the fluidized drying process and then by the stationary drying process. In the fluidized drying process, air or an inert gas (nitrogen gas, helium gas, argon gas or the like) is used as a heating gas. The temperature of the heating gas is typically not higher than 95° C., preferably 40° C. to 90° C. If the temperature is higher than 95° C., the percentage of the colored pellets after the heat treatment tends to be increased.

The flow speed of the heating gas in the dryer for the fluidized drying process is typically 0.3 to 1 m/second, preferably 0.4 to 0.9 m/second, particularly preferably 0.5 to 0.8 m/second. In general, it is considered that a higher heating gas flow speed is preferred in the fluidized drying process for improvement of the productivity. If the heating gas flow speed in the dryer is higher than 1 m/second, however, the divalent metal salt is liable to migrate to the pellet surfaces supposedly due to an excessively high drying speed. This may result in the localization of the divalent metal salt in the pellets. Further, the percentage of the colored pellets after the heat treatment is liable to be increased supposedly due to uneven drying, resulting in insufficient reduction in the melt viscosity of the pellet group during the heating. If the heating gas flow speed is lower than 0.3 m/second, the EVOH resin composition pellets are liable to be fuse-bonded to each other.

The period for the fluidized drying process depends on the amount of the EVOH resin composition pellets to be processed, but is typically 10 minutes to 5 hours, preferably 30 minutes to 2 hours. If the drying period is shorter than 10 minutes, the percentage of the colored pellets after the heat treatment tends to be increased. If the drying period is longer than 5 hours, the EVOH resin composition pellets obtained after the stationary drying process are liable to suffer from extrusion variations during the melt forming.

After the EVOH resin composition pellets are subjected to the fluidized drying process under the aforementioned conditions, the EVOH resin composition pellets typically have a water content of 5 to 40 wt. %, more preferably 20 to 40 wt. %. If the water content is lower than 5 wt. %, the EVOH resin composition pellets obtained after the stationary drying process are liable to suffer from extrusion variations during the melt forming. If the water content is higher than 40 wt. %, on the other hand, the percentage of the colored pellets after the heat treatment tends to be increased.

The EVOH resin composition pellets subjected to the fluidized drying process in the aforementioned manner are further subjected to the stationary drying process. In the stationary drying process, an inert gas (nitrogen gas, helium gas, argon gas or the like) is used as a heating gas. The temperature of the heating gas is preferably not lower than 75° C., more preferably 85° C. to 150° C. If the temperature is lower than 75° C., it is necessary to increase the drying period, resulting in disadvantageous economy.

The flow speed of the heating gas in the dryer for the stationary drying process is typically lower than 1 m/second, more preferably 0.01 to 0.5 m/second. A heating gas flow speed of higher than 1 m/second is not preferred, because it is difficult to keep the EVOH resin composition pellets stationary.

The period for the stationary drying process depends on the amount of the EVOH resin composition pellets to be processed, but is typically 10 minutes to 72 hours, preferably 1 to 48 hours. After the EVOH resin composition pellets are subjected to the stationary drying process under the aforementioned conditions, the dried EVOH resin composition pellets are finally obtained.

The EVOH resin composition pellets finally obtained after the stationary drying process preferably have a water content of 0.001 to 2 wt. %, more preferably 0.01 to 1 wt. %, particularly preferably 0.05 to 0.3 wt. %. If the water content is excessively low, the percentage of the colored pellets after the heat treatment tends to be increased. If the water content is excessively high, on the other hand, a product formed from the EVOH resin composition pellets is liable to be foamed.

The water content is measured by the following method.

First, the weight C1 of an aluminum cup is measured, and 10 g of the pellets are put in the aluminum cup. Then, the weight (C1+P1) of the aluminum cup containing the pellets (having a weight P1) is measured. The aluminum cup containing the pellets is heat-treated at 150° C. for 5 hours in a dryer (SAFETY OVEN SPH-100 commercially available from ESPEC Corporation) without replacement with nitrogen and vacuum drawing. After the heat treatment, the aluminum cup containing the pellets is taken out of the dryer and placed still in a desiccator containing a desiccant for 30 minutes, whereby the temperature of the pellets is returned to a room temperature (23° C.). Then, the weight (C1+P2) of the aluminum cup containing the pellets (having a weight P2) after the heat treatment is measured, and the water content (wt. %) is calculated from the following mathematical expression (1):

$$\text{Water content (wt. \%)} = [\{(C1+P1)-(C1+P2)\}/\{(C1+P1)-C1\}] \times 100 = \{(P1-P2)/P1\} \times 100 \quad (1)$$

The EVOH resin composition pellets obtained after the drying each have substantially the same shape as the EVOH resin pellets obtained after the cutting. More specifically, the cylindrical EVOH resin composition pellets each have a bottom face diameter of 1.5 to 5.5 mm and a length of 1.5 to 5.5 mm (preferably a bottom face diameter of 2.5 to 4.5 mm and a length of 2.5 to 4.5 mm) after the drying. The oval EVOH resin composition pellets produced by the in-water cutting method each have a diameter of 1.5 to 5.5 mm (preferably a diameter of 2.5 to 4.5 mm) after the drying.

The inventive EVOH resin composition pellet group thus produced is excellent in long-run processability with the melt viscosity thereof significantly reduced during the heating.

The EVOH resin composition for the inventive EVOH resin composition pellet group may further contain other thermoplastic resin such as a polyolefin resin or a polyamide resin. For the productivity of the EVOH resin composition pellets, the proportion of the other thermoplastic resin is typically not greater than 3 wt. %, preferably 0 to 1 wt. %, particularly preferably 0 wt. %.

The inventive EVOH resin composition pellet group prepared in the aforementioned manner is melt-formed into a product. Before the melt forming, a component other than the EVOH resin may be mixed with the inventive EVOH resin composition pellet group to provide a forming material.

The proportion of the EVOH resin is typically 50 to 100 wt. %, preferably 60 to 99 wt. %, particularly preferably 70 to 90 wt. %, based on the weight of the overall forming material.

The thermoplastic resin other than the EVOH resin may be blended typically in a proportion of not greater than 30 wt. % based on the weight of the EVOH resin in the forming material.

Specific examples of the other thermoplastic resin include olefin homopolymers and olefin copolymers such as linear low-density polyethylenes, low-density polyethylenes, medium-density polyethylenes, high-density polyethylenes, ethylene-vinyl acetate copolymers, ionomers, ethylene-propylene copolymers, ethylene-α-olefin (C4 to C20 α-olefin) copolymers, ethylene-acrylate copolymers, polypropylenes, propylene-α-olefin (C4 to C20 α-olefin) copolymers, polybutenes, and polypentenes, polycycloolefins, polyolefin resins in a broader sense such as obtained by graft-modifying any of these olefin homopolymers and olefin copolymers with an unsaturated carboxylic acid or an unsaturated carboxylate, polystyrene resins, polyesters, polyamides, polyamide copolymers, polyvinyl chlorides, polyvinylidene chlorides, acryl resins, vinyl ester resins, polyester elastomers, polyurethane elastomers, chlorinated polyethylenes, and chlorinated polypropylenes.

The thermoplastic resin is typically prepared from a petroleum-derived material such as naphtha. Other usable examples of the material for the thermoplastic resin include natural gas-derived materials such as shale gas, and plant-derived materials such as obtained by refining sugar and starch contained in sugar cane, sugar beet, corn, potato and the like, and cellulose contained in rice, wheat, millet, grass and the like.

Particularly, where the forming material containing the inventive EVOH resin composition pellet group is used for production of a multilayer structure as a food packaging material, the polyamide resin is preferably blended in the forming material in order to prevent the EVOH resin from leaching from an end portion of the packaging material after the packaging material is subjected to hot water treatment.

As required, the forming material containing the inventive EVOH resin composition pellet group may contain known additives in proportions that do not impair the effects of the present disclosure (e.g., in proportions of less than 5 wt. % based on the weight of the overall resin composition) in addition to the aforementioned ingredients. Examples of the additives include: a plasticizer such as of an aliphatic polyhydric alcohol (e.g., ethylene glycol, glycerin, hexanediol, or the like); a lubricant such as of a saturated fatty acid amide (e.g., stearamide or the like), an unsaturated fatty acid amide (e.g., oleamide or the like), a bis-fatty acid amide (e.g., ethylene bisstearamide or the like) or a low-molecular-weight polyolefin (e.g., a low-molecular-weight polyethylene or a low-molecular-weight polypropylene having a molecular weight of about 500 to about 10000); a heat stabilizer; an antiblocking agent; an antioxidant; a colorant; an antistatic agent; a UV absorber; an antibacterial agent; a filler (e.g., an inorganic filler or the like); a crystal nucleating agent (e.g., talc, kaolin, or the like); a surfactant; a wax; a dispersant (e.g., stearic acid monoglyceride, or the like); a conjugated polyene compound; and an aldehyde compound (e.g., an unsaturated aldehyde such as crotonaldehyde or the like).

The heat stabilizer is added in order to improve various physical properties (e.g., the heat stability) of the forming material during the melt forming. Examples of the heat stabilizer include organic acids such as acetic acid, propionic acid, butyric acid, lauric acid, stearic acid, oleic acid and behenic acid, and alkali metal salts (sodium salts, potassium salts and the like) of these organic acids; and inorganic acids such as sulfuric acid, sulfurous acid, carbonic acid, phosphoric acid and boric acid, and alkali metal salts (sodium salts, potassium salts and the like) of these inorganic acids. Of these heat stabilizers, acetic acid, boric acid, a boron compound including a borate, an acetate or a phosphate is particularly preferably added to the forming material.

Exemplary melt-forming methods include an extrusion method (e.g., a T-die extrusion method, an inflation extrusion method, a blowing method, a melt-spinning method, a profile extrusion method or the like) and an injection molding method. The melt-forming temperature is typically selected from a range of 150° C. to 300° C. The forming material is often used in applications of multilayer structures. Particularly, the forming material is used for production of a multilayer structure including a layer of an EVOH resin and a layer of a thermoplastic resin provided on at least one side of the EVOH resin layer.

For the production of the multilayer structure, a layer of other base material is stacked on one side or both sides of a layer of the forming material. Exemplary stacking methods include: a method in which a film or a sheet of the forming material is laminated with the thermoplastic resin by melt extrusion; a method in which a base layer of the thermoplastic resin or the like is laminated with the forming material by melt extrusion; a method in which the forming material and the other thermoplastic resin are coextruded; and a method in which a film or a sheet of the EVOH resin composition prepared in the present disclosure and a film or a sheet of the other base material are bonded together by dry laminating with the use of a known adhesive agent such as of an organic titanium compound, an isocyanate compound, a polyester compound, or a polyurethane compound.

Examples of the other resin for the coextrusion include: olefin homopolymers and olefin copolymers such as linear low-density polyethylenes, low-density polyethylenes, medium-density polyethylenes, high-density polyethylenes, ethylene-vinyl acetate copolymers, ionomers, ethylene-propylene copolymers, ethylene-acrylate copolymers, polypropylenes, propylene-α-olefin (C4 to C20 α-olefin) copolymers, polybutenes, and polypentenes, polyolefin resins in a broader sense such as obtained by graft-modifying any of these olefin homopolymers and olefin copolymers with an unsaturated carboxylic acid or an unsaturated carboxylate, polyesters, polyamides, polyamide copolymers, polyvinyl chlorides, polyvinylidene chlorides, acryl resins, polystyrenes, polyethylene terephthalates, vinyl ester resins, polyester elastomers, polyurethane elastomers, chlorinated polyethylenes, and chlorinated polypropylenes. The EVOH resin may also be used for the coextrusion. Among the aforementioned resins, the polypropylenes, the polyamides, the polyethylenes, the ethylene-vinyl acetate copolymers, the polystyrenes, and the polyethylene terephthalates are preferred for easy film formation by the coextrusion and for the practicality of the physical properties (particularly, the strength) of the film.

Where a formed product such as a film or a sheet is formed from the forming material including the inventive EVOH resin composition pellet group and then extrusion-coated with the other base material or laminated with a film or a sheet of the other base material with the use of an adhesive agent, usable examples of the base material other than the thermoplastic resin described above include paper, a metal foil, a uniaxially or biaxially stretched plastic film or sheet, a woven fabric, a nonwoven fabric, a metal fiber material and a wood material. Where layers x (x1, x2, . . . ) of the EVOH resin and layers y (y1, y2, . . . ) of the other base material (e.g., the thermoplastic resin) are stacked to form a multilayer structure for a film, a sheet or a bottle, the layered structure of the multilayer structure is not limited to a double layer structure x/y, but may be any combination of these layers, e.g., y/x/y, x/y/x, x1/x2/y, x/y1/y2, y2/y1/x/y1/y2, or the like. Where the multilayer structure is a filament, the filament may be of a bimetal type x-y, a core (x)-sheath (y) type, a core (y)-sheath (x) type, or an eccentric sheath-core type.

The multilayer structure is used as it is in various forms, but may be further subjected to a stretching process for improvement of the physical properties of the multilayer structure. The stretching process may be a uniaxial stretching process or a biaxial stretching process. Higher-ratio stretching is advantageous for physical properties, and provides a stretched film and a stretched sheet free from pinholes, uneven stretching and delamination.

A roll stretching method, a tenter stretching method, a tubular stretching method, a stretch blowing method, a deep drawing method, or a vacuum forming method having a higher stretch ratio may be employed for the stretching process. The biaxial stretching process may be a simultaneous stretching process or a sequential stretching process. The temperature for the stretching is typically selected from a range of 80° C. to 170° C., preferably about 100° C. to about 160° C.

After the stretching, the multilayer structure may be further subjected to a heat-setting process. The heat-setting process may be performed in a known manner. The stretched multilayer structure (film) is typically heat-treated at 80° C. to 170° C., preferably 100° C. to 160° C., for about 2 to about 600 seconds, while being kept tense. Where the stretched film is used for heat shrink packaging of raw meat, processed meat, cheese or the like, a product film is produced by stretching the multilayer structure without the heat setting, and the raw meat, the processed meat, cheese or the like is wrapped with the product film, which is in turn heat-treated at 50° C. to 130° C., preferably 70° C. to 120° C., for about 2 to about 300 seconds to be thereby heat-shrunk for tight seal packaging.

The multilayer structure thus produced may have any form. Examples of the form include a sheet, a film, a tape, a bottle, a pipe, a filament, and a profile extrusion product. As required, the multilayer structure thus produced may be further subjected to a heating process, a cooling process, a rolling process, a printing process, a dry laminating process, a solution or melt coating process, a bag forming process, a deep drawing process, a box forming process, a tube forming process, a splitting process or the like. The film, the sheet, the container and the like produced in the aforementioned manner are useful as packaging materials for food, pharmaceutical products, industrial chemicals, agricultural chemicals, and the like.

EXAMPLES

The present disclosure will hereinafter be described more specifically by way of an example thereof. However, it should be understood that the present disclosure be not limited to the example within the scope of the present disclosure.

It is noted that "parts" and "%" are based on weight unless otherwise specified.

Example 1

A water/methanol mixture solution (having a water/methanol mixing weight ratio of 35/65, an EVOH resin concentration of 40% and a solution temperature of 60° C.) of an ethylene-vinyl alcohol copolymer (having an ethylene content of 44 mol %, a saponification degree of 99.7 mol %, and an MI of 12 g/10 minutes as measured at 210° C. with a load of 2160 g) was extruded into a strand form through a hollow cylindrical nozzle in a coagulation bath (having a water/methanol mixing weight ratio of 97/3). Then, the resulting strands were kept in contact with the coagulation liquid, taken out of the coagulation bath and cut by a cutter. Thus, cylindrical white porous pellets each having a diameter of 3.7 mm and a length of 4 mm were produced.

Subsequently, the EVOH resin pellets thus produced were washed with hot water at 35° C. The resulting EVOH resin pellets had a water content of 58%. The EVOH resin pellets were put in an aqueous solution containing 0.005 parts of sodium acetate (on a metal basis), 0.1 part of acetic acid, 0.004 parts of boric acid (on a boron basis) and 0.002 parts of magnesium acetate (on a metal basis) based on 100 parts of the EVOH resin at 30° C., and stirred in the aqueous solution for 4 hours. Thus, EVOH resin composition pellets were produced that had a water content of 41% and contained 0.009 parts of sodium acetate (on a metal basis), 0.250 parts of acetic acid, 0.015 parts of boric acid (on a boron basis) and 0.0008 parts of magnesium acetate (on a metal basis) based on 100 parts of the EVOH resin. The ratio of the aqueous solution to the EVOH resin pellets was 200:100 (parts).

The EVOH resin composition pellets were dried in a fluidization dryer for 1 hour by blowing air at a flow speed of 0.7 m/second at a temperature of 77° C. into the dryer. The EVOH resin composition pellets had a water content of 28%. Then, the EVOH resin composition pellets were further dried in a stationary dryer for 18 hours by blowing nitrogen gas at a flow speed of 0.3 m/second at a temperature of 120° C. into the dryer. Thus, a group of dry EVOH resin composition pellets having a water content of 0.15% was produced. The pellets thus produced each had a cylindrical shape having a diameter of 2.5 mm and a length of 2.5 mm.

Then, 92 pellets of the resulting EVOH resin composition pellet group were placed on an aluminum foil, and heat-treated at 230° C. for 30 minutes in a muffle furnace FO510 (available from Yamato Scientific Co., Ltd.) preheated to 230° C. In turn, the heat-treated pellets were cooled to a room temperature (23° C.), and surfaces of the pellets were each analyzed through spectrometry by means of a spectrophotometer CM-2600d (available from Konica Minolta, Inc.) having a custom mask measuring window diameter of 3 mm. As the result of the measurement, no pellet had a b*-value of 5 or greater in an SCI (specular component included) mode, and the percentage of pellets having a b*-value of 5 or greater was 0%.

[Evaluation for Long-Run Processability]

After 55 g of the resulting EVOH resin composition pellet group (not subjected to the heat treatment) was put in a torque detection type rheometer (PLASTOGRAPH available from Brabender GmbH) set at a temperature of 250° C. and preheated for 5 minutes, the EVOH resin composition group was melt-kneaded at a rotation speed of 50 rpm. After a lapse of 10 minutes and 15 minutes from the start of the melt-kneading, torque levels (Nm) were measured. The ratio ($T_{15}/T_{10}$) of the torque level $T_{15}$ measured 15 minutes after the start of the melt-kneading to the torque level $T_{10}$ measured 10 minutes after the start of the melt-kneading was calculated. A smaller torque level ratio calculated from the above expression means excellent long-run processability with a reduced melt viscosity, and a greater torque level ratio means poorer long-run processability with an insufficiently reduced melt viscosity.

Comparative Example 1

A group of EVOH resin composition pellets was produced in substantially the same manner as in Example 1, except that the temperature, the blowing gas flow speed and the drying period for the fluidization dryer were 68° C., 1.1 m/second and 0.5 hours, respectively, for the drying conditions. After the fluidized drying, the EVOH resin composition pellets had a water content of 28%. Then, 100 pellets of the EVOH resin composition pellet group were heat-treated in the same manner as in Example 1. Out of the 100 pellets, 5 pellets had a b*-value of 5 or greater. Therefore, the percentage of the pellets colored by the heat treatment was 5%. The EVOH resin composition pellet group (not subjected to the heat treatment) was evaluated for long-run processability in the same manner.

The evaluation results for Example and Comparative Example are shown in Table 1.

TABLE 1

| | Percentage of pellets having b*-value of 5 or greater | Evaluation for long-run processability ($T_{15}/T_{10}$) |
|---|---|---|
| Example 1 | 0% | 0.82 |
| Comparative Example 1 | 5% | 0.91 |

As can be understood from Table 1, where the percentage of the pellets having a b*-value of 5 or greater is not higher than 3%, the ratio ($T_{15}/T_{10}$) of the torque level $T_{15}$ to the torque level $T_{10}$ is not greater than 0.9, indicating that the long-run processability is excellent with a significantly reduced melt viscosity.

While a specific form of an embodiment of the present disclosure has been shown in the aforementioned inventive example, the inventive example is merely illustrative of the disclosure but not limitative of the disclosure. It is contemplated that various modifications apparent to those skilled in the art could be made within the scope of the disclosure.

The inventive EVOH resin composition pellet group contains the EVOH resin and the divalent metal salt, and the percentage of the pellets colored by the heat treatment at 230° C. for 30 minutes is not higher than 3%. Therefore, the inventive EVOH resin composition pellet group is excellent in long-run processability with a significantly reduced melt viscosity during the heating, and is industrially very useful.

The invention claimed is:

1. A group of pellets of an ethylene-vinyl alcohol copolymer resin composition comprising:
    an ethylene-vinyl alcohol copolymer; and
    a divalent metal salt;
    wherein when the pellets are heat-treated at 230° C. for 30 minutes, not greater than 3% of the pellets have a b*-value of not less than 5, and
    wherein the divalent metal salt is present in a proportion of 0.0005 to 0.0008 parts by weight on a metal basis based on 100 parts by weight of the ethylene-vinyl alcohol copolymer in the ethylene-vinyl alcohol copolymer resin composition.

* * * * *